(12) United States Patent
Coble et al.

(10) Patent No.: US 12,511,801 B2
(45) Date of Patent: Dec. 30, 2025

(54) GENERATING VIDEO STREAMS TO DEPICT BOT PERFORMANCE DURING AN AUTOMATION RUN

(71) Applicant: Capital One Services, LLC, McLean, VA (US)

(72) Inventors: Piper Alexandra Coble, Richmond, VA (US); Coy Madison Durie, Gadsden, AL (US); Mario Munoz, Richmond, VA (US); Andrew O'Sullivan, Charlottesville, VA (US); Jerry Wagner, Chesterfield, VA (US)

(73) Assignee: Capital One Services, LLC, McLean, VA (US)

( * ) Notice: Subject to any disclaimer, the term of this patent is extended or adjusted under 35 U.S.C. 154(b) by 258 days.

(21) Appl. No.: 18/050,327

(22) Filed: Oct. 27, 2022

(65) Prior Publication Data
US 2024/0144558 A1    May 2, 2024

(51) Int. Cl.
G06T 11/20  (2006.01)
G06F 11/07  (2006.01)
G06F 11/34  (2006.01)

(52) U.S. Cl.
CPC ........ *G06T 11/206* (2013.01); *G06F 11/0769* (2013.01); *G06F 11/3409* (2013.01)

(58) Field of Classification Search
CPC .............. G06T 11/206; G06T 11/0769; G06T 11/3409; G06F 11/0769; G06F 11/3409; G06F 18/2411; G06F 2201/84; G06F 11/0778; G06F 11/3636; G06F 11/3476; G06F 2201/865; G06V 10/764;
(Continued)

(56) References Cited

U.S. PATENT DOCUMENTS 5,864,875 A * 1/1999 Van Huben ............. G06F 30/00
5,909,548 A * 6/1999 Klein ................. G08B 13/1968
                                                   348/E7.086
(Continued)

OTHER PUBLICATIONS

L. Erlenhov, F. Gomes de Oliveira Neto, R. Scandariato and P. Leitner, "Current and Future Bots in Software Development," 2019 IEEE/ACM 1st International Workshop on Bots in Software Engineering (BotSE), Montreal, QC, Canada, 2019, pp. 7-11, doi: 10.1109/BotSE.2019.00009. (Year: 2019).*
(Continued)

*Primary Examiner* — Charles L Beard

(57) ABSTRACT

In some implementations, a monitoring system may capture a set of screenshots that depict behavior associated with a bot during an automation run. The monitoring system may obtain one or more logs that include information describing the behavior of the bot during the automation run. The monitoring system may create, based on a portion of the set of screenshots, video data that includes a sequence of frames related to an anomaly or a failure event that occurred during the automation run. The monitoring system may annotate, based on the information included in the one or more logs, the sequence of frames with metadata describing the behavior of the bot. The monitoring system may provide, to a user device, user interface data that includes the video data and the metadata used to annotate the sequence of frames.

20 Claims, 8 Drawing Sheets

(58) Field of Classification Search
CPC .... G06V 20/41; G06V 20/52; G06V 2201/06; H04N 5/765; H04N 7/181; H04L 43/55
See application file for complete search history.

(56) References Cited

U.S. PATENT DOCUMENTS

| | | | | |
|---|---|---|---|---|
| 5,968,135 A * | 10/1999 | Teramoto | G06F 9/52 | 709/248 |
| 6,259,969 B1 * | 7/2001 | Tackett | G06N 3/006 | 702/182 |
| 6,694,507 B2 * | 2/2004 | Arnold | G06F 11/3466 | 707/999.103 |
| 6,708,227 B1 * | 3/2004 | Cabrera | G06F 11/1451 | 709/202 |
| 7,216,338 B2 * | 5/2007 | Barnett | G06F 11/3672 | 717/146 |
| 7,286,897 B2 * | 10/2007 | Liu | G05B 23/0267 | 345/418 |
| 7,519,953 B2 * | 4/2009 | Reissman | G06F 11/3672 | 717/124 |
| 7,653,896 B2 * | 1/2010 | Herdeg, III | G06F 9/45512 | 717/109 |
| 7,788,644 B2 * | 8/2010 | Koduru | G06F 11/3471 | 717/124 |
| 7,954,094 B2 * | 5/2011 | Cascaval | G06F 9/45516 | 717/145 |
| 8,359,582 B2 * | 1/2013 | Elliott | G06F 11/3644 | 717/148 |
| 8,478,948 B2 * | 7/2013 | Panchenko | G06F 12/1441 | 717/124 |
| 8,909,641 B2 * | 12/2014 | Bullotta | G06F 16/9038 | 707/736 |
| 8,935,673 B1 * | 1/2015 | Ashkenazi | G06F 11/3636 | 717/124 |
| 8,966,447 B2 * | 2/2015 | Hoke | G06F 11/3672 | 717/124 |
| 8,972,787 B2 * | 3/2015 | Mahesh | G06F 11/0706 | 714/37 |
| 8,984,331 B2 * | 3/2015 | Quinn | G06F 11/0709 | 714/4.2 |
| 9,195,829 B1 * | 11/2015 | Goradia | G06F 21/50 | |
| 9,311,221 B2 * | 4/2016 | Wood | G06F 11/323 | |
| 9,817,971 B2 * | 11/2017 | Peleg | G06F 21/554 | |
| 9,916,506 B1 * | 3/2018 | Davis | G06V 10/22 | |
| 10,019,336 B2 * | 7/2018 | Allen | G06F 11/302 | |
| 10,067,858 B2 * | 9/2018 | McDonald | G06F 11/0712 | |
| 10,089,214 B1 * | 10/2018 | Dixit | G06F 11/3055 | |
| 10,133,650 B1 * | 11/2018 | Park | G06F 11/3684 | |
| 10,250,531 B2 * | 4/2019 | Ray | H04L 51/02 | |
| 10,289,411 B2 * | 5/2019 | Davis | G06F 11/3636 | |
| 10,399,227 B1 * | 9/2019 | Islam | B25J 9/1697 | |
| 10,623,233 B1 * | 4/2020 | McConnell | H04L 43/08 | |
| 10,649,883 B2 * | 5/2020 | Cheng | G06F 11/3636 | |
| 10,713,307 B2 * | 7/2020 | Bliss | G06F 16/951 | |
| 10,768,076 B1 * | 9/2020 | Oostendorp | G05B 23/0245 | |
| 10,796,156 B2 | 10/2020 | Billi et al. | | |
| 10,862,779 B2 * | 12/2020 | Sahoo | H04L 43/045 | |
| 10,906,184 B2 * | 2/2021 | Islam | G06T 7/73 | |
| 11,132,285 B1 * | 9/2021 | Sukhyani | G06F 11/3636 | |
| 11,138,539 B2 * | 10/2021 | Sethi | G06Q 10/0633 | |
| 11,216,303 B1 * | 1/2022 | Willson | G06F 9/4881 | |
| 11,327,723 B1 * | 5/2022 | Gersht | G06F 11/323 | |
| 11,403,136 B1 * | 8/2022 | Willson | G06F 9/541 | |
| 11,442,837 B2 * | 9/2022 | Kunnath | G06F 11/3476 | |
| 11,502,923 B1 * | 11/2022 | Kumar | G06F 16/986 | |
| 11,593,132 B1 * | 2/2023 | Rane | G06F 9/45558 | |
| 11,875,566 B1 * | 1/2024 | Amini | G06V 20/40 | |
| 11,921,620 B2 * | 3/2024 | Varada | G06T 13/80 | |
| 2002/0138226 A1 * | 9/2002 | Doane | G06F 11/2294 | 714/E11.173 |
| 2003/0135844 A1 * | 7/2003 | Yellin | G06F 11/3612 | 717/126 |
| 2003/0182620 A1 * | 9/2003 | Errico | H04N 21/84 | 715/202 |
| 2004/0052501 A1 * | 3/2004 | Tam | H04N 5/76 | 348/E7.086 |
| 2006/0177119 A1 * | 8/2006 | McPheely | G05B 19/4184 | 382/141 |
| 2007/0078824 A1 * | 4/2007 | Dorgelo | G06F 16/2228 | |
| 2007/0226697 A1 * | 9/2007 | Barsness | G06F 11/3612 | 717/127 |
| 2007/0266045 A1 * | 11/2007 | Bansal | H04L 67/125 | |
| 2008/0263379 A1 * | 10/2008 | Tuuk | G06F 11/0757 | 713/375 |
| 2008/0269932 A1 * | 10/2008 | Chardon | G06F 3/0481 | 700/98 |
| 2009/0055593 A1 * | 2/2009 | Satoyama | G06F 3/065 | 711/134 |
| 2009/0077055 A1 * | 3/2009 | Dillon | G05B 23/0272 | 707/999.005 |
| 2009/0217247 A1 * | 8/2009 | Kamigata | G06F 11/3612 | 717/131 |
| 2009/0228670 A1 * | 9/2009 | Nakagawa | G06F 11/1662 | 711/E12.001 |
| 2009/0292742 A1 * | 11/2009 | Morgan | G06F 11/3476 | |
| 2009/0319758 A1 * | 12/2009 | Kimura | G06F 9/3851 | 712/E9.001 |
| 2010/0077388 A1 * | 3/2010 | Kimura | G06F 11/3466 | 717/163 |
| 2010/0100860 A1 * | 4/2010 | Chang | G06F 30/331 | 716/111 |
| 2011/0197097 A1 * | 8/2011 | Beaty | H04L 43/55 | 714/27 |
| 2012/0102373 A1 * | 4/2012 | Waugh | G06F 11/0778 | 714/57 |
| 2012/0297163 A1 * | 11/2012 | Breternitz | G06F 9/5066 | 712/E9.034 |
| 2013/0123965 A1 * | 5/2013 | Cooper | G06F 16/2465 | 700/97 |
| 2013/0227350 A1 * | 8/2013 | O'Riordan | G06F 11/3636 | 714/45 |
| 2013/0262804 A1 * | 10/2013 | Nagumo | G06F 3/0641 | 711/162 |
| 2014/0006938 A1 * | 1/2014 | Black | G06T 11/206 | 715/255 |
| 2014/0109050 A1 * | 4/2014 | Gibbens | G06F 11/368 | 717/124 |
| 2014/0109051 A1 * | 4/2014 | Mcdonald | G06F 11/0772 | 717/124 |
| 2014/0109052 A1 * | 4/2014 | Tempel | G06F 11/0769 | 717/124 |
| 2014/0109057 A1 * | 4/2014 | Gibbens | G06F 11/3698 | 717/124 |
| 2014/0109063 A1 * | 4/2014 | Schissel | G06F 11/3688 | 717/127 |
| 2014/0236899 A1 * | 8/2014 | Eggers | G06F 3/065 | 707/639 |
| 2014/0289710 A1 * | 9/2014 | Goto | G06F 11/3636 | 717/128 |
| 2015/0006861 A1 * | 1/2015 | Toll | G06F 9/46 | 712/225 |
| 2015/0025683 A1 * | 1/2015 | Amano | B25J 9/1692 | 700/254 |
| 2015/0128103 A1 * | 5/2015 | Stratton | G06F 8/00 | 717/100 |
| 2015/0269194 A1 * | 9/2015 | King | G06F 11/3698 | 707/805 |
| 2015/0269427 A1 * | 9/2015 | Kim | G06V 20/52 | 348/159 |
| 2015/0294483 A1 * | 10/2015 | Wells | G06T 7/564 | 382/103 |
| 2015/0347274 A1 * | 12/2015 | Taylor | G06F 11/3698 | 717/125 |
| 2015/0347286 A1 * | 12/2015 | Kruglick | H04L 43/50 | 714/38.1 |
| 2016/0132538 A1 * | 5/2016 | Bliss | G06F 16/20 | 707/741 |
| 2016/0259709 A1 * | 9/2016 | Anand | G06F 16/248 | |
| 2016/0274558 A1 * | 9/2016 | Strohmenger | G05B 15/02 | |
| 2016/0292895 A1 * | 10/2016 | Billi | G06F 3/04845 | |

(56) References Cited

U.S. PATENT DOCUMENTS

| | | | |
|---|---|---|---|
| 2017/0025155 A1* | 1/2017 | Fang | H04N 21/4402 |
| 2017/0300753 A1* | 10/2017 | Billi | G06V 20/52 |
| 2018/0089831 A1* | 3/2018 | Liu | G06T 7/70 |
| 2018/0121309 A1* | 5/2018 | Tabak | G06F 11/36 |
| 2018/0130260 A1* | 5/2018 | Schmirler | G06F 3/011 |
| 2018/0131907 A1* | 5/2018 | Schmirler | G05B 23/0216 |
| 2018/0267884 A1* | 9/2018 | Dhanda | G06F 11/368 |
| 2018/0300193 A1* | 10/2018 | Cheng | G06F 11/0733 |
| 2018/0300197 A1* | 10/2018 | Marron | G06F 11/0778 |
| 2018/0300437 A1* | 10/2018 | Thomsen | G06F 16/24573 |
| 2018/0304466 A1* | 10/2018 | Machino | B25J 9/1697 |
| 2018/0339456 A1* | 11/2018 | Czinger | B29C 64/379 |
| 2018/0349704 A1* | 12/2018 | Mehrseresht | G06F 18/295 |
| 2018/0357334 A1* | 12/2018 | Chao | G05B 19/41885 |
| 2019/0129827 A1* | 5/2019 | Ramasamy | G06F 11/3668 |
| 2019/0138289 A1* | 5/2019 | Advani | G06F 8/65 |
| 2019/0163601 A1* | 5/2019 | Botman | G06F 11/348 |
| 2019/0179718 A1* | 6/2019 | Brace | G06F 11/0715 |
| 2019/0188114 A1* | 6/2019 | Hopper | G06F 11/3414 |
| 2019/0258863 A1* | 8/2019 | Billi | H04N 7/181 |
| 2019/0303456 A1* | 10/2019 | Lim | G06F 16/178 |
| 2019/0317850 A1* | 10/2019 | Chau | G06F 8/61 |
| 2020/0133819 A1* | 4/2020 | Grossman | G09B 19/0053 |
| 2020/0183806 A1* | 6/2020 | Lin | G06F 11/3684 |
| 2020/0238514 A1* | 7/2020 | Chinnasamy | G06F 8/00 |
| 2020/0306970 A1* | 10/2020 | Latkar | G06F 11/0766 |
| 2020/0310902 A1* | 10/2020 | Chimura | G06F 11/3476 |
| 2020/0336706 A1* | 10/2020 | Schmirler | G06T 19/006 |
| 2020/0336707 A1* | 10/2020 | Schmirler | H04N 7/181 |
| 2020/0363815 A1* | 11/2020 | Mousavian | G06T 7/75 |
| 2020/0364128 A1* | 11/2020 | Vittal | G06F 9/45558 |
| 2021/0012155 A1* | 1/2021 | Vu | G06F 18/2132 |
| 2021/0117308 A1* | 4/2021 | Burgos | G06N 20/00 |
| 2021/0342216 A1* | 11/2021 | Dines | G06F 11/0706 |
| 2021/0383010 A1* | 12/2021 | Massiglia | G06F 11/2092 |
| 2022/0032457 A1* | 2/2022 | Anand | G06V 40/20 |
| 2022/0066785 A1* | 3/2022 | Lee | G06F 11/14 |
| 2022/0101016 A1* | 3/2022 | Sachdeva | G06T 7/0004 |
| 2022/0150106 A1* | 5/2022 | McTaggart | H04L 41/5009 |
| 2022/0163947 A1* | 5/2022 | Michan | G05B 23/0281 |
| 2022/0263897 A1* | 8/2022 | Karr | G06F 11/1448 |
| 2022/0300198 A1* | 9/2022 | Gao | G06F 11/3409 |
| 2022/0300336 A1* | 9/2022 | Major | G06F 11/3419 |
| 2022/0318002 A1* | 10/2022 | Copty | G06F 11/3079 |
| 2022/0342551 A1* | 10/2022 | Bora | G06F 11/1435 |
| 2022/0365508 A1* | 11/2022 | Abbu | G05B 23/0213 |
| 2022/0374274 A1* | 11/2022 | Chen | G06F 11/3447 |
| 2022/0382616 A1* | 12/2022 | Brych | G06F 11/108 |
| 2023/0004478 A1* | 1/2023 | Susman | G06F 11/3636 |
| 2023/0099448 A1* | 3/2023 | McTaggart | H04L 43/0876 709/224 |
| 2023/0111754 A1* | 4/2023 | Jones | G06F 18/2148 382/141 |
| 2023/0143922 A1* | 5/2023 | Cosareanu | G06F 9/451 718/107 |
| 2023/0147668 A1* | 5/2023 | Penugonda | G06F 11/0772 714/38.1 |
| 2023/0188436 A1* | 6/2023 | Barr | H04L 41/5074 709/224 |
| 2023/0222044 A1* | 7/2023 | Arveti | G06F 11/3055 717/168 |
| 2023/0236910 A1* | 7/2023 | Marinovici | G06F 40/205 715/234 |
| 2023/0259788 A1* | 8/2023 | Eelen | G06N 3/105 706/25 |
| 2024/0231331 A1* | 7/2024 | Ma | G05B 19/418 |
| 2024/0255932 A1* | 8/2024 | Frackowiak | G06V 20/52 |
| 2024/0289258 A1* | 8/2024 | Landis | G06F 11/3698 |
| 2025/0021426 A1* | 1/2025 | Kwon | G06F 11/0787 |
| 2025/0029010 A1* | 1/2025 | Yu | G06F 11/2041 |

OTHER PUBLICATIONS

C. Lebeuf, M.-A. Storey and A. Zagalsky, "Software Bots," in IEEE Software, vol. 35, No. 1, pp. 18-23, Jan./Feb. 2018, doi: 10.1109/MS.2017.4541027. (Year: 2018).*

Vinayak et al., "Your Bots Are Going to Fail—Here's How to Prevent It," NTT Data Services, Feb. 2020, 6 pages.

* cited by examiner

FIG. 1C

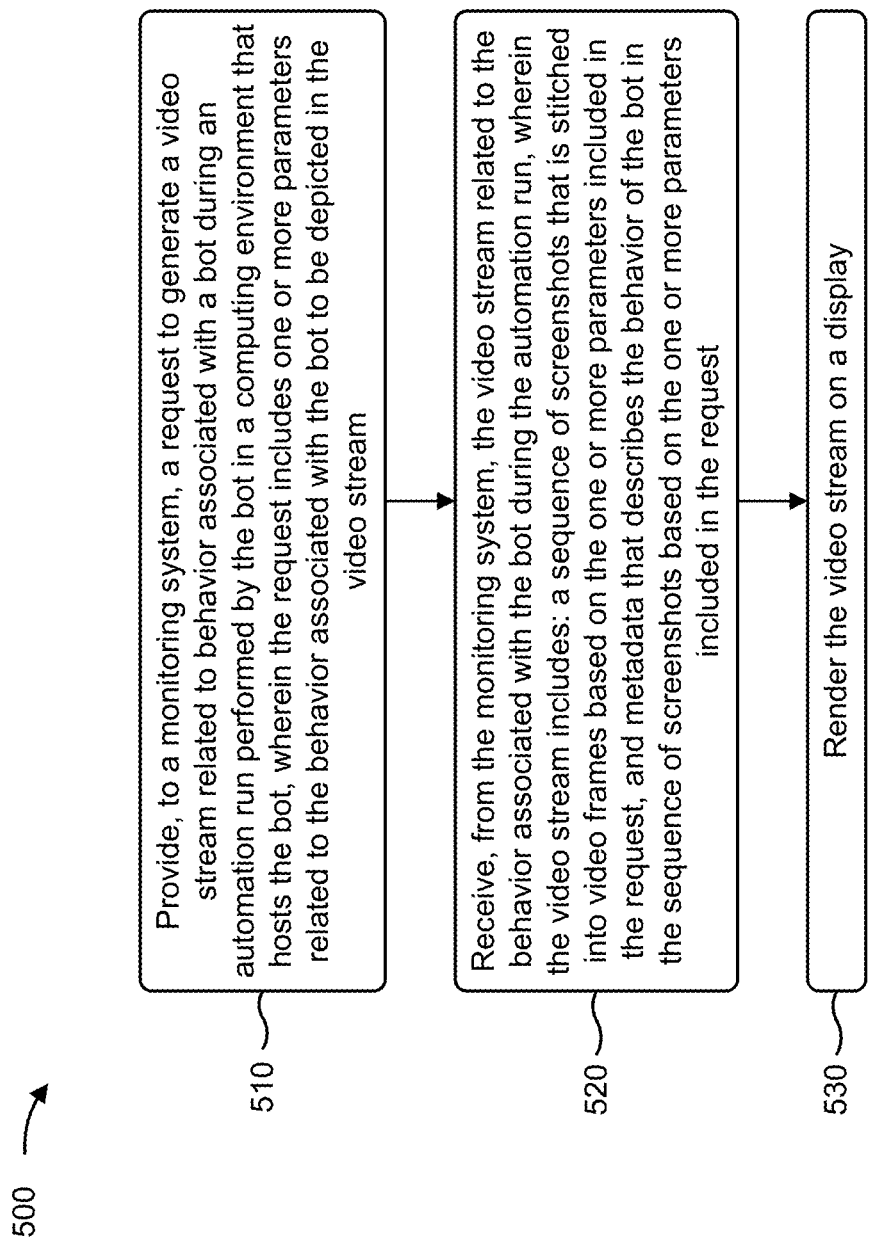

GENERATING VIDEO STREAMS TO DEPICT BOT PERFORMANCE DURING AN AUTOMATION RUN

BACKGROUND

Automation describes various technologies that reduce human intervention in processes by making determinations relating to decision criteria, subprocess relationships, and/or related actions and then implementing the determinations in one or more machines. For example, robotic process automation (RPA) is a technology that relies on a scalable, digital workforce to streamline manual processes and reduce burdens on human users by offloading repetitive or routine tasks to software bots that can perform the tasks more efficiently and/or more accurately. Bot automation uses software robots, commonly referred to as bots, to interact with applications, systems, and/or workflows to streamline processes without human intervention. In this way, an organization can configure and deploy bots to automate tedious or error-prone processes such that human workers can focus on more strategic, value-added initiatives.

SUMMARY

Some implementations described herein relate to a system for generating video streams to depict bot performance. The system may include one or more memories and one or more processors communicatively coupled to the one or more memories. The one or more processors may be configured to capture a time-ordered sequence of screenshots that depict behavior associated with a bot during an automation run performed by the bot in a computing environment. The one or more processors may be configured to obtain one or more logs that include information to describe the behavior associated with the bot during the automation run performed by the bot. The one or more processors may be configured to detect that an anomaly or failure event occurred during the automation run. The one or more processors may be configured to create, based on a portion of the time-ordered sequence of screenshots, video data that includes a sequence of frames related to the anomaly or failure event. The one or more processors may be configured to annotate, based on the information included in the one or more logs, the sequence of frames included in the video data with metadata that describes the behavior of the bot in the sequence of frames related to the anomaly or failure event. The one or more processors may be configured to provide, to a user device, user interface data that includes the video data and the metadata used to annotate the sequence of frames.

Some implementations described herein relate to a method for rendering video streams related to bot performance. The method may include providing, by a user device to a monitoring system, a request to generate a video stream related to behavior associated with a bot during an automation run performed by the bot in a computing environment that hosts the bot, where the request includes one or more parameters related to the behavior associated with the bot to be depicted in the video stream. The method may include receiving, by the user device from the monitoring system, the video stream related to the behavior associated with the bot during the automation run, where the video stream includes: a sequence of screenshots that is stitched into video frames based on the one or more parameters included in the request, and metadata that describes the behavior of the bot in the sequence of screenshots based on the one or more parameters included in the request. The method may include rendering, by the user device, the video stream on a display.

Some implementations described herein relate to a non-transitory computer-readable medium that stores a set of instructions for a monitoring system. The set of instructions, when executed by one or more processors of the monitoring system, may cause the monitoring system to capture time-ordered data that represents behavior associated with a bot during an automation run performed by the bot in a computing environment. The set of instructions, when executed by one or more processors of the monitoring system, may cause the monitoring system to obtain one or more logs that include information to describe the behavior associated with the bot during the automation run performed by the bot. The set of instructions, when executed by one or more processors of the monitoring system, may cause the monitoring system to annotate, based on the information included in the one or more logs, the time-ordered data that represents the behavior associated with the bot during the automation run with metadata that describes the behavior associated with the bot. The set of instructions, when executed by one or more processors of the monitoring system, may cause the monitoring system to provide, to a user device, user interface data that includes a rendering of the time-ordered data and the metadata used to annotate the time-ordered data.

BRIEF DESCRIPTION OF THE DRAWINGS

FIGS. 1A-1D are diagrams of an example implementation associated with generating video streams to depict bot performance during an automation run, in accordance with some embodiments of the present disclosure.

FIGS. 4-5 are flowcharts of example processes associated with generating video streams to depict bot performance during an automation run, in accordance with some embodiments of the present disclosure.

DETAILED DESCRIPTION

Figure 1A:
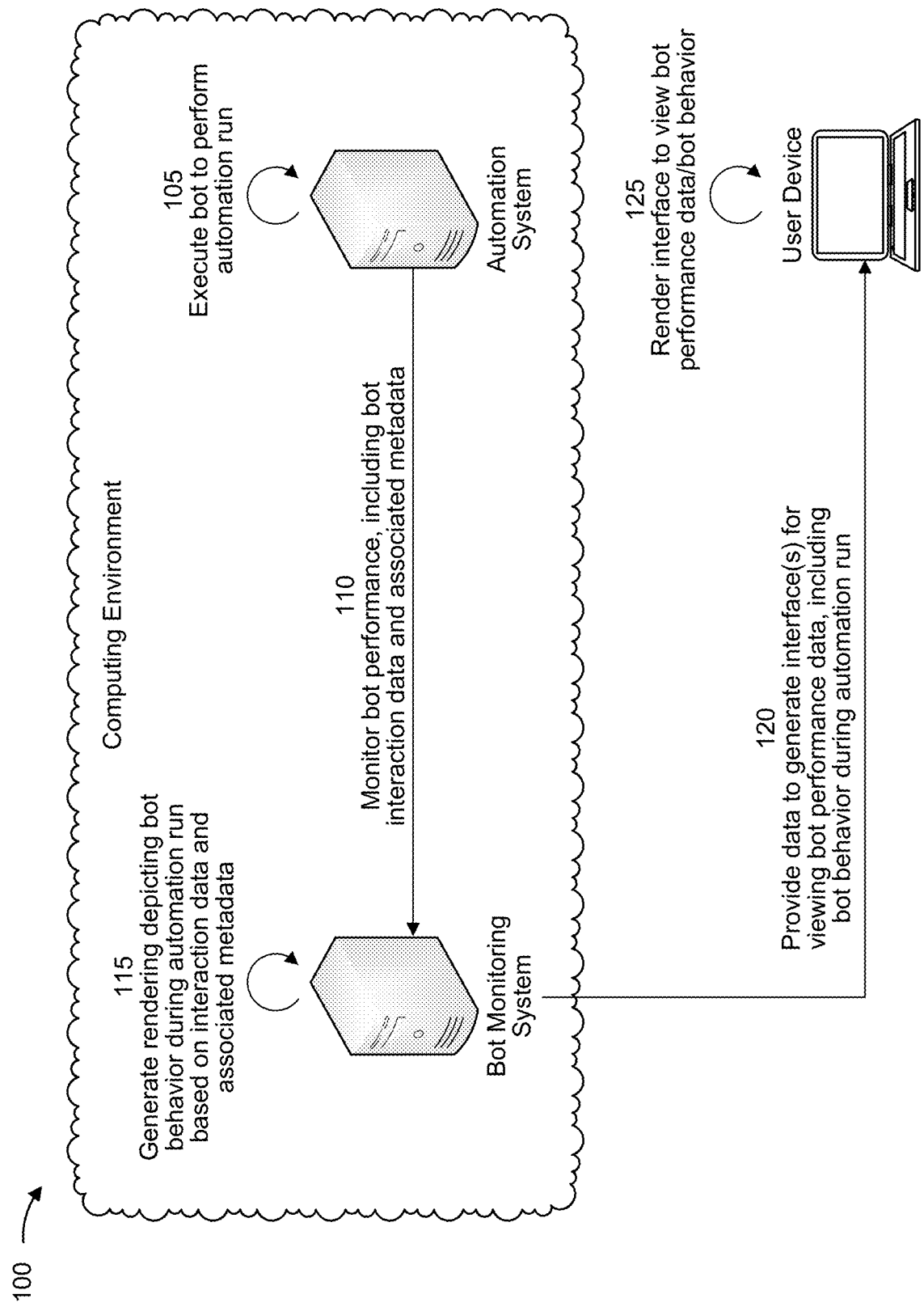

The following detailed description of example implementations refers to the accompanying drawings. The same reference numbers in different drawings may identify the same or similar elements.

Software bots are simple or complex computer programs that are designed to perform specific actions, such as automating repetitive or routine tasks or simulating human users, among other examples. Essentially, a software bot is an information technology tool to support, simulate, and/or replace human work. In some cases, a software bot may be created by a software developer or a software development team identifying one or more actions to be automated and then building a computer program to interface with a computing environment to automatically perform the one or more actions. Additionally, or alternatively, a software bot may be created using robotic process automation (RPA) technology that provides a codeless user interface or other front-end that allows any user, including less technically inclined users, to build a bot that can perform tasks in a computing environment that would otherwise have to be performed by a human. Accordingly, as described herein, a software bot can be executed in a computing environment to interpret and trigger responses and communicate with various systems in order to perform various repetitive and/or routine tasks and/or mimic actions of human users (e.g., logging into applications, moving files and folders, copying and pasting data, filling in forms, extracting data from documents, and/or scraping web browsers, among other examples).

Although software bots are a valuable and impactful information technology tool that can offer increased accuracy, increased efficiency, flexibility to work across multiple platforms, decreased costs, and increased productivity for human users, software bots are subject to limitations. For example, software bots are generally deployed as agents that layer over existing software platforms and/or other computing infrastructure, which may expose weaknesses in the software being automated and/or cause the software bot to fail because software bots are often unable to adapt to unexpected errors. In a similar respect, because software bots mimic human behavior in a static manner, software bots lack a human's ability to adapt to change such that any change to an underlying system will necessitate reconfiguring or rewriting the instructions associated with the software bots running over the underlying system. Furthermore, software bots may pose operational risks because software bots do not instinctively know when something has gone wrong and will not stop to ask questions, whereby unnoticed bugs in the code of a software bot may result in compounding errors. In addition, software bots present security risks, in that bots that are not well-controlled can be compromised by malware or other threats that exploit the high processing capabilities and access granted to software bots.

Accordingly, because software bots may not work as expected and/or may fail to perform assigned tasks, bot monitoring systems are needed to monitor bot performance and provide insights into the reasons behind any software bot failures. However, traditional bot monitoring systems suffer from various limitations and drawbacks. For example, a traditional bot monitoring system may provide capabilities to monitor work queues, schedules, and execution rules and/or capabilities to start, stop, or clone software bots, but the help offered by a traditional bot monitoring system tends to be reactive (e.g., triggering bot failure alerts only after the failure event has already occurred). Accordingly, traditional bot monitoring systems generally lack capabilities to predict or prevent bot failures. Furthermore, multiple bot platforms often lead to a need to deploy multiple bot monitoring systems that are either not integrated or challenging to integrate (e.g., resulting in data collection, performance metrics, and/or other information related to bot performance being distributed across different monitoring systems).

In some implementations, as described herein, a bot monitoring system may monitor one or more software bots that execute one or more automation runs in a computing environment and generate video data or another suitable rendering to depict the behavior of the one or more software bots during the one or more automation runs. For example, in some implementations, the bot monitoring system may capture time-ordered data that relates to the behavior of the one or more software bots during the one or more automation runs, where the time-ordered data may include a sequence of screenshots, text-based interaction data, and/or other suitable data, which the bot monitoring system may stitch together into video data that includes a sequence of frames. In addition, the one or more bots may be configured to generate one or more logs that describe the behaviors or activities that occur during the one or more automation runs, and the bot monitoring system may use information contained in the one or more logs to create metadata that is used to annotate the sequence of frames or other time-ordered data related to the behavior of the one or more software bots during the one or more automation runs.

In this way, when the bot monitoring system determines that a failure event or an anomaly occurred during the one or more automation runs, the sequence of frames or other time-ordered data may be rendered on a user device to allow a human user to view the behavior of the one or more bots during the one or more automation runs and/or use the associated metadata to diagnose the failure event or anomaly. Furthermore, the bot monitoring system may be deployed in the computing environment where the one or more bots are executed, which may allow an automation owner or developer to view the rendering of the bot performance without having to log into or otherwise access the computing environment that hosts and executes the one or more bots. Furthermore, in some implementations, the bot monitoring system may support capabilities to increase or decrease a frequency at which the screenshots or other interaction data is captured and/or to use machine learning models to annotate certain actions within the rendering and/or remove irrelevant or duplicate data items from the time-ordered data used to generate the rendering of the one or more automation runs (e.g., to provide greater granularity within the rendering or reduce a storage burden associated with the screenshots or other interaction data). Furthermore, by providing a user device a video or other rendering that depicts the behavior of the software bot during the automation run, the automation run may be displayed or otherwise recreated to enable user investigation without requiring that the user device log into or otherwise access the computing environment where the software bot is hosted and executed. In this way, providing the video or other rendering to the user device may conserve computing resources that would otherwise be consumed by connecting the user device to the computing environment and/or setting up a testing or debugging environment to recreate the automation run, among other examples.

FIGS. 1A-1D are diagrams of an example 100 associated with generating video streams to depict bot performance during an automation run. As shown in FIGS. 1A-1D, example 100 includes an automation system, a bot monitoring system, and a user device. The automation system, the bot monitoring system, and the user device are described in more detail in connection with FIG. 2 and FIG. 3.

As shown in FIG. 1A, and by reference number 105, the automation system may be configured to execute one or more software bots to perform one or more automation runs. As described herein, the automation system may be deployed in a computing environment to execute one or more software bots (e.g., within a virtual machine or other suitable container), where a software bot may include any suitable computer program configured to interact with one or more applications, systems, workflows, or other information technology resources in order to automatically carry out one or more tasks without human intervention. For example, in a data mining use case, one or more software bots may be configured to index and catalog websites, scan websites for specific keywords, collate documents, or deliver specific information based on designated keystrokes. In another example, in a customer service use case, a software bot may be configured as a chatbot to interact with end users and provide real-time answers to questions that users may have about products or services. In other examples, a software bot in an electronic commerce use case may be configured to organize and catalogue products, monitor inventories, or build datasheets, a software bot in a healthcare use case may be used to track patient care and streamline administrative tasks such as creating or updating patient charts, or a software bot in a legal use case may be used to generate legal documents such as contracts, non-disclosure agreements, or privacy policies, among other examples.

Accordingly, as described herein, a software bot may generally include any suitable software agent or computer program that carries out one or more information technology tasks on behalf of one or more users. For example, a software bot executed by the automation system may include an intelligent bot that exhibits at least some artificial intelligence (e.g., reasoning), an autonomous bot that can modify a sequence of activities or techniques that are used to achieve one or more objectives of the autonomous bot, a distributed bot that can execute on physically distinct computers, a multi-bot system that includes multiple software bots that work together to achieve an objective that otherwise could not be accomplished or would be more difficult to accomplish using a single software bot, and/or a mobile bot that can relocate execution from one information technology to another. Furthermore, in some implementations, the automation system may execute the one or more software bots to perform one or more automation runs, which may include attended automation runs and/or unattended automation runs. For example, in an attended automation run, a software bot may work alongside a human user to make one or more tasks easier and/or perform actions when a user commands the software bot to run. On the other hand, in an unattended automation run, a software bot may work behind the scenes without any user supervision or user interaction and/or may be triggered when certain events occur (e.g., a file being added to a folder) to manage large volumes of data and/or information.

In some implementations, the software bots executed by the automation system may include one or more bots that are created and deployed by a software developer or a software development team and/or one or more bots that are created and deployed by one or more users using a robotic process automation (RPA) utility or other suitable front-end interface (e.g., a PyScript framework that provides a Python-based front-end to enable users to construct Python programs or scripts using a browser interface). In any case, the software bots executed by the automation system may be used to automate routine processes, risk controls, repetitive tasks, and/or any other suitable activities that involve interaction with one or more information technology resources, and there may be one or more users (e.g., bot owners, bot creators, bot developers, or the like) that have an interest in the performance and status of the behavior associated with the software bots. In existing bot monitoring systems, if a software bot were to fail (e.g., failing to complete a task or perform the task correctly), the interested user(s) would have to log into the computing environment where the software bot was executed and search through logs or other records of the activities performed by the software bot in order to diagnose what went wrong and/or determine an appropriate course of action to remedy the failure. In addition to consuming computing resources by requiring that the interested user(s) log into the computing environment where the software bot was hosted and executed, existing bot monitoring systems fall short in providing contextual information to enable users to diagnose and remedy a failure that occurs when a software bot performs an automation run. Accordingly, as described herein, the bot monitoring system may be deployed in the computing environment where the software bots are hosted and executed, and may be configured to monitor software behavior (e.g., interaction data) associated with the software bots in order to create user-friendly renderings that allow interested users to quickly and easily understand a context that may have led to the outcome of a particular automation run (e.g., including successful automation runs, failed automation runs, anomalous automation runs, or the like). Furthermore, by providing the user device with a video or other rendering that depicts the behavior of the software bot during the automation run, the automation run may be displayed or otherwise recreated to enable user investigation without requiring that the user device log into or otherwise access the computing environment where the software bot is hosted and executed. In this way, providing the video or other rendering to the user device may conserve computing resources that would otherwise be consumed by connecting the user device to the computing environment and/or setting up a testing or debugging environment to recreate the automation run, among other examples For example, as shown by reference number 110, the bot monitoring system may be deployed in the computing environment in which the automation system is running (e.g., a desktop computing environment, a cloud computing environment, a virtual machine container, or any other suitable environment), and may monitor bot performance data that includes interaction data and associated metadata that relate to behavior of the software bots during the monitored automation runs. For example, while the software bots are running, the software bots may generally interact with one or more computer systems, applications, or other information technology resources to carry out the tasks associated with the corresponding automation runs. Accordingly, during the automation runs, the software bots may perform interactions or activities that cause changes to a user interface, such as loading an application, entering data into an interface of the application, submitting commands to be executed, changing applications, or the like. In some implementations, the bot monitoring system may be configured to periodically capture screenshots that depict a state of the user interface over the course of an automation run, which may subsequently be used to create renderings (e.g., videos or other media) that depict the behavior of the software bot during the automation run. Additionally, or alternatively, the bot monitoring system may be configured to capture other suitable interaction data, such as audio that is generated during the automation run (e.g., system alerts such as audio notifications that are output when a task is completed or an error event is encountered) and/or text that the software bot enters as input and/or receives as output (e.g., via a command line interface or chatbot interface, among other examples). Accordingly, in some implementations, the bot monitoring system may generally capture time-ordered data that relates to behavior of the software bots during the automation runs, which can be used to generate a rendering that provides a heads-up display, dashboard, or dashcam-like interface for displaying the performance of a software bot during an automation run.

In some implementations, as described herein, the time-ordered data captured by the bot monitoring system may include a time-ordered sequence of screenshots that are captured at a configurable frequency during an automation run performed by a software bot. For example, the bot monitoring system may capture the screenshots, which may depict a visual state of a user interface (e.g., a desktop environment or a specific window or application) at a particular point in time. In some implementations, the screenshots may be captured at a default frequency or a frequency that can be configured by a user (e.g., via the user device) to provide finer or coarser granularity into the behavior that occurred during a particular automation run. For example, twenty-four (24) frames per second is often defined as the frame rate frequency needed to create a film or video-like rendering, but capturing 24 frames per second may lead to large storage requirements for the image data without necessarily providing greater context into the behavior that occurred during the automation run. Accordingly, a lower default frequency may be used (e.g., twelve (12) frames per second or one (1) frame per second), which may reduce a storage burden associated with the image data and/or conserve computing resources that would otherwise be consumed by capturing a large number of frames per second, and the frequency may be increased or decreased by a user depending on the level of detail needed by the user. Additionally, or alternatively, the frequency at which the screenshots are captured may be adjusted based on the state of the automation run (e.g., the screenshots may be captured more frequently if an anomalous event is detected, such as a sudden spike in processor activity or an abnormally long delay between tasks, may be captured more frequently if there are a large number of tasks being performed in a short amount of time, may be captured less frequently if the software bot is idle while performing a task that has a lengthy processing delay, such as a splash screen that is expected to be displayed with no change for several seconds, or the like). In this way, by generally capturing screenshots at a lower default frequency and occasionally increasing the rate to a higher frequency, the level of detail provided in the rendering may be more detailed or meaningful around certain events or time periods of interest (e.g., a time that includes, leads up to, or follows an anomaly or failure event) while conserving more computing and storage resources in the default state.

Additionally, or alternatively, the time-ordered data captured by the bot monitoring system may include other suitable inputs and/or outputs that occur during an automation run and/or metrics that relate to performance of a software bot. For example, the software bot may perform interactions that cause audible system warnings or other audible notifications, which may provide further context to help a user understand the behavior of the software bot during an automation run (e.g., audio notifications can be combined with screenshots into a multimedia video that could then be played back by the user, and an audio notification may provide a signal to a reviewing user that the screenshots leading up to the audio notification are worth specific attention). Additionally, or alternatively, the software bots may perform interactions that generate text (e.g., simulating human keystrokes) or cause text to be displayed or output (e.g., based on a change to a user interface or a response elicited from an application or system with which the software bot is interacting). Accordingly, in some implementations, the bot monitoring system may capture any suitable time-ordered data that relates to a context of an automation run being performed by a software bot, including screenshots (or images) that depict a graphical or visual state of a user interface, sounds that would otherwise have been generated to attract the attention of a human user that the software bot is simulating, and/or text that the software bot is generating and/or causing another system to generate, among other examples.

In some implementations, in addition to the time-ordered data related to the interactions performed by the software bot, the bot monitoring system may capture data from one or more logs that describe the behaviors or interactions associated with the software bot. For example, while the software bot is being executed by the automation system, the software bot may generate one or more logs that record various events that occur during the automation run or messages that are communicated by the software bot or a system with which the software bot interacts. For example, the one or more logs may be associated with a syslog standard that can be used to record logging data related to system management, security auditing, informational messages, analytical messages, debugging information, and/or triggered activities, among other examples. More generally, the log data collected or otherwise obtained by the bot monitoring system may include time-stamped data that provide context for behaviors of the software bot during an automation run, such as time-stamped data related to actions serviced by one or more applications launched or triggered by the software bot, decisions made by the one or more applications, actions initiated by the one or more applications, and/or runtime characteristics of the one or more applications, among other examples. Accordingly, as described herein, the information contained in the one or more logs can be used to derive metadata that can then be used to tag certain actions, activities, events, objects, or other elements in the time-ordered data captured during the automation run. For example, the bot monitoring system may tag certain screenshots with metadata that describes the state of the user interface at the corresponding time (e.g., a timestamp associated with a screenshot may be correlated with a timestamp associated with an event described in a log to determine that the event and the screenshot are temporally related). Furthermore, the bot monitoring system may take a similar approach to tag other suitable time-ordered data with information contained in the one or more logs.

In some implementations, as described herein, the bot monitoring system may use one or more machine learning models or machine learning techniques to annotate the time-ordered data with metadata from the one or more logs and/or to evaluate a state of an automation run being performed by a software bot. For example, in some implementations, the bot monitoring system may collect time-ordered screenshots, audio samples, text data, logging data, and/or any other suitable data related to historical automation runs, which may be used to train one or more machine learning models to determine and/or predict whether a monitored automation run is running in a normal manner, experiencing an anomalous or failure condition, and/or is about to fail, among other examples. For example, the machine learning models may be trained (e.g., by the bot monitoring system or a separate device) using historical data related to successful and/or failed automation runs, and the machine learning models can be used to create the machine learning models that can predict the success, failure, or anomaly state of a future automation run (e.g., based on certain patterns that indicate whether an automation run is likely to succeed or fail and/or experiencing an anomaly based on a deviation from historical patterns). In addition, the machine learning models may be trained to associate significant or noteworthy events during the course of an automation run with the time-ordered screenshots or other time-ordered data related to software bot interactions during an automation run in order to perform a filtering function to focus on certain time periods that may be more relevant to understanding or troubleshooting an automation run. For example, the machine learning models may be trained to identify duplicate frames within a sequence of screenshots that may not add any further context to the behavior that occurred during an automation run and/or to identify frames within the sequence of screenshots that are irrelevant to an event of interest (e.g., not relevant to a failure or anomaly). In this way, using the machine learning models to filter out irrelevant or duplicate frames may significantly reduce the storage and processing burden associated with a potentially large volume of screenshots, audio clips, text data, or the like, and may also enable curating the time-ordered interaction data and the associated log data to efficiently generate a rendering that can be displayed on the user device and viewed by a user to understand the context of an automation run.

For example, as shown by reference number 115, the bot monitoring system may generate a rendering to depict the behavior of a software bot during an automation run based on time-ordered interaction data and associated metadata. For example, in the description provided herein, the rendering may include a video that is created from a time-ordered sequence of screenshots, although it will be appreciated that other suitable renderings may be generated (e.g., a textual rendering based on a combination of textual information contained in the one or more logs and text-based descriptions of interactions performed by the software bots, which may be associated with lower storage and/or processing requirements than video renderings). In some implementations, the bot monitoring system may generate the rendering on-demand based on a request from the user device. For example, in some implementations, a user of the user device may be a developer, owner, or consumer of a software bot running on the automation system, and may request the rendering to display the performance of the software bot during the automation run. In some cases, the user may request to generate a rendering to display the entirety of the automation run, or may provide one or more criteria to limit the rendering to a particular time period (e.g., a period of x minutes or another suitable duration that includes, leads up to, and/or follows a failure or anomaly event). Additionally, or alternatively, the bot monitoring system may proactively generate the rendering based on detecting a failure event or an anomaly event when the behavior of the software bot during a monitored automation run deviates from historical bot behavior during successful automation runs and/or is following a similar pattern as historical bot behavior during failed automation runs. In either case, the rendering that is generated by the bot monitoring system may effectively recreate the behavior of the software bot during at least a portion of the automation run of interest to a user of the user device.

Accordingly, to generate the rendering of the behavior of the software bot during the automation run, the bot monitoring system may obtain, from the time-ordered sequence of screenshots (and/or other interaction data), a subset of the screenshots (and/or other interaction data) that are included within a period of interest (e.g., a time period that is defined relative to a particular event, such as a start of the automation run or a failure event detected during the automation run, or in absolute terms, such as a starting time and an ending time). In some implementations, the bot monitoring system may then stitch the time-ordered sequence of screenshots into video data that includes a sequence of frames depicting the behavior of the software bot during the period of interest. In some implementations, the bot monitoring system may further obtain, from the one or more logs describing the activities or behaviors of the software bot, data that relates to the frames (e.g., user interface views) included in the video data. Accordingly, the frames that are included in the video data may be annotated with metadata that is derived from the information contained in the one or more logs (e.g., based on timestamp correlations or relevance scores that are derived using machine learning techniques). Furthermore, as described herein, the bot monitoring system may identify screenshots and/or other interaction data that may not be relevant to an event of interest (e.g., a series of user interface views that proceeded as-expected and/or are unlikely to be related to an event or series of events that the user wants to recreate) and/or duplicate screenshots that do not add any meaningful context to the rendering (e.g., only one screenshot may be needed when the user interface view is static, as may occur during a period when the software bot is idle). In this way, by excluding the irrelevant and/or duplicate screenshots from the video data, the rendering generated by the bot monitoring system may be used to efficiently recreate the most impactful views of the behavior of the software bot (e.g., using significantly fewer frames, and therefore less data, to convey the same amount of meaningful information).

As further shown in FIG. 1A, and by reference number 120, the bot monitoring system may provide, to the user device, user interface data that can be used to generate one or more interfaces on the user device for displaying the performance of one or more software bots. In particular, as described herein, the user interface data may include video data or other suitable renderings of the behavior of one or more software bots during one or more automation runs, which may be provided to the user device on-demand (e.g., in response to a request from the user device) and/or proactively when a failure or anomaly event is detected. Additionally, or alternatively, the user device may provide criteria to subscribe to one or more renderings of bot behavior. For example, a user of the user device may be interested in viewing the behavior of a software bot that successfully completes an important automation run or a software bot that interacts with one or more information technology resources where sensitive data is stored, and the bot monitoring system may generate the rendering and the supporting user interface data when one or more software bots perform an automation run that satisfies the specified criteria. In this way, selectively generating the rendering when specified criteria occur (e.g., a failure or anomaly event is detected and/or user-specified criteria are satisfied) may conserve resources that would otherwise be consumed by generating renderings of all automation runs, including those that may not be of interest to any users (e.g., successful and/or routine automation runs). Furthermore, in cases where the rendering includes video data or other rendering to display the behavior of a software bot during an automation run that experienced a failure or anomaly event, the user interface data may include an alert to bring the failure or anomaly event to the attention of a user and/or one or more recommendations to correct or remedy the behavior that led to the failure or anomaly event (e.g., identifying a task that caused the failure or anomaly event and suggesting debugging for the automation programming around that task).

Accordingly, as shown by reference number 125, the user interface data may be rendered by the user device to display the behavior of the software bot during the automation run. For example, rather than having to set up the software bot in a new (e.g., testing or debugging) environment under the same conditions as an actual automation run to recreate what the software bot did that may have led to a particular outcome (e.g., whether a successful, failed, or anomalous automation run) to assess whether the same outcome occurs in the new environment, the user interface data may use actual screenshots, audio clips, text interactions, and/or other data that led to the outcome of interest to create a dashcam-like rendering of the interactions or behaviors that led to the outcome of interest. Furthermore, using the data contained in the logs to annotate the rendering may provide more context to allow the user to understand the context of the automation run, such as what tasks the software bot was attempting to perform when the user interface had a particular visual state. In other words, the rendering may allow the user to determine what the software bot was doing during the automation run as though the software bot was actually running on the user device when performing the automation run. In this way, the rendering (e.g., video data from stitched screenshots) avoids a need for the user to log into the computing environment where the software bot is hosted to view the performance of the software bot and/or avoids a need to allocate additional computing resources to setting up a testing or debugging environment to recreate an automation run with no guarantee that the desired outcome of interest (e.g., a particular failure mode or anomaly mode) will occur in the new environment.

Figure 1B:
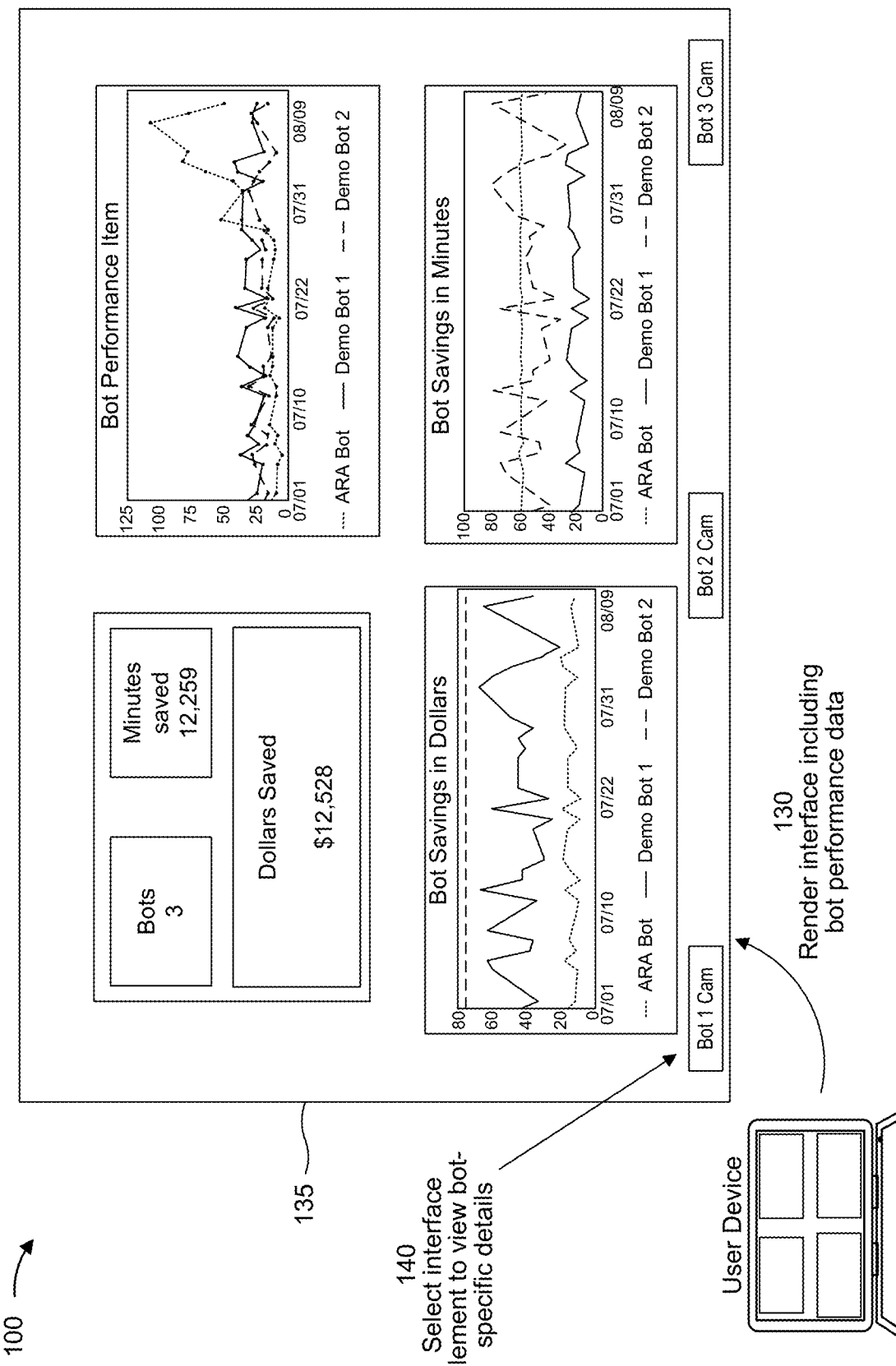
Figure 1C:
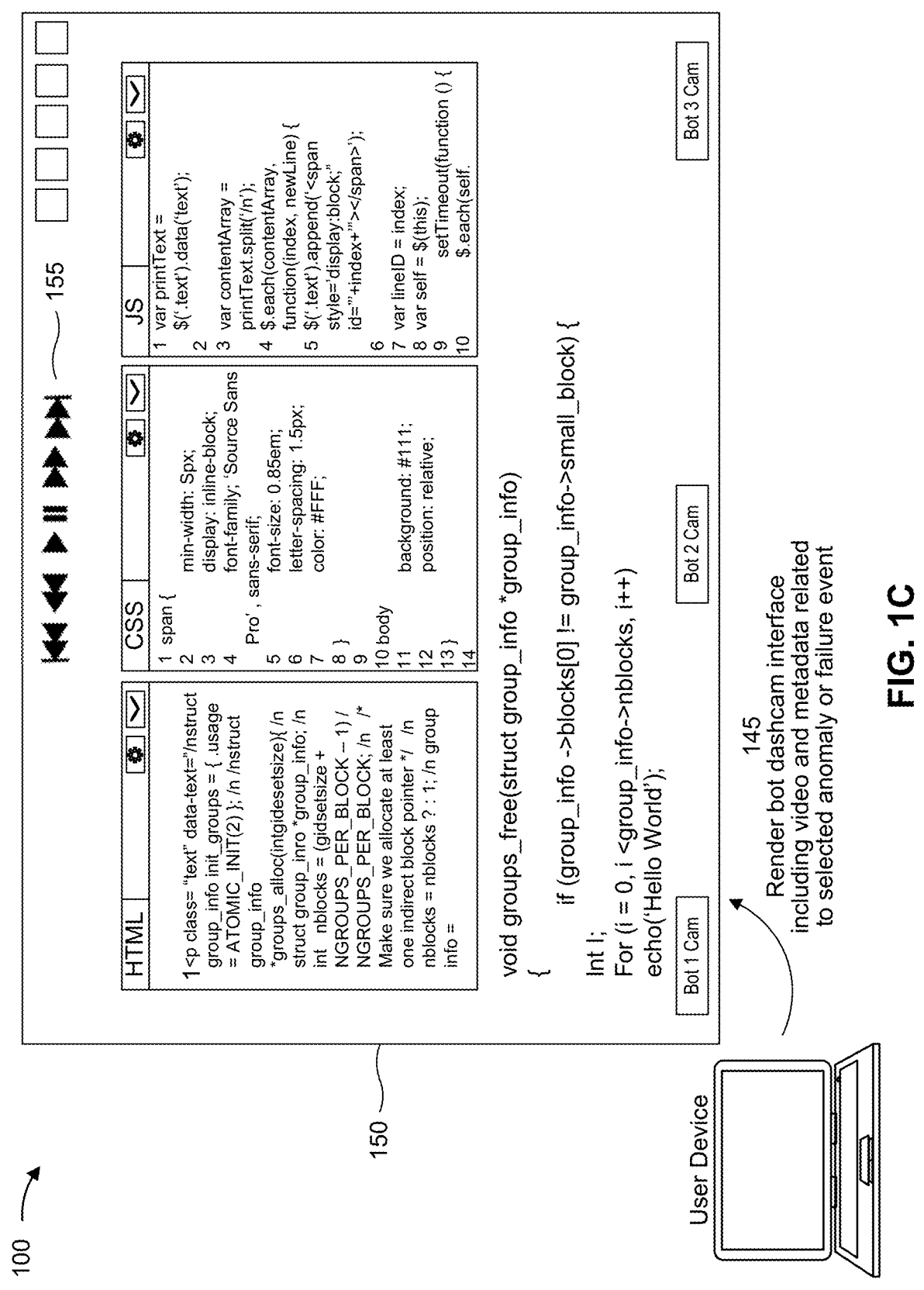
Figure 1D:
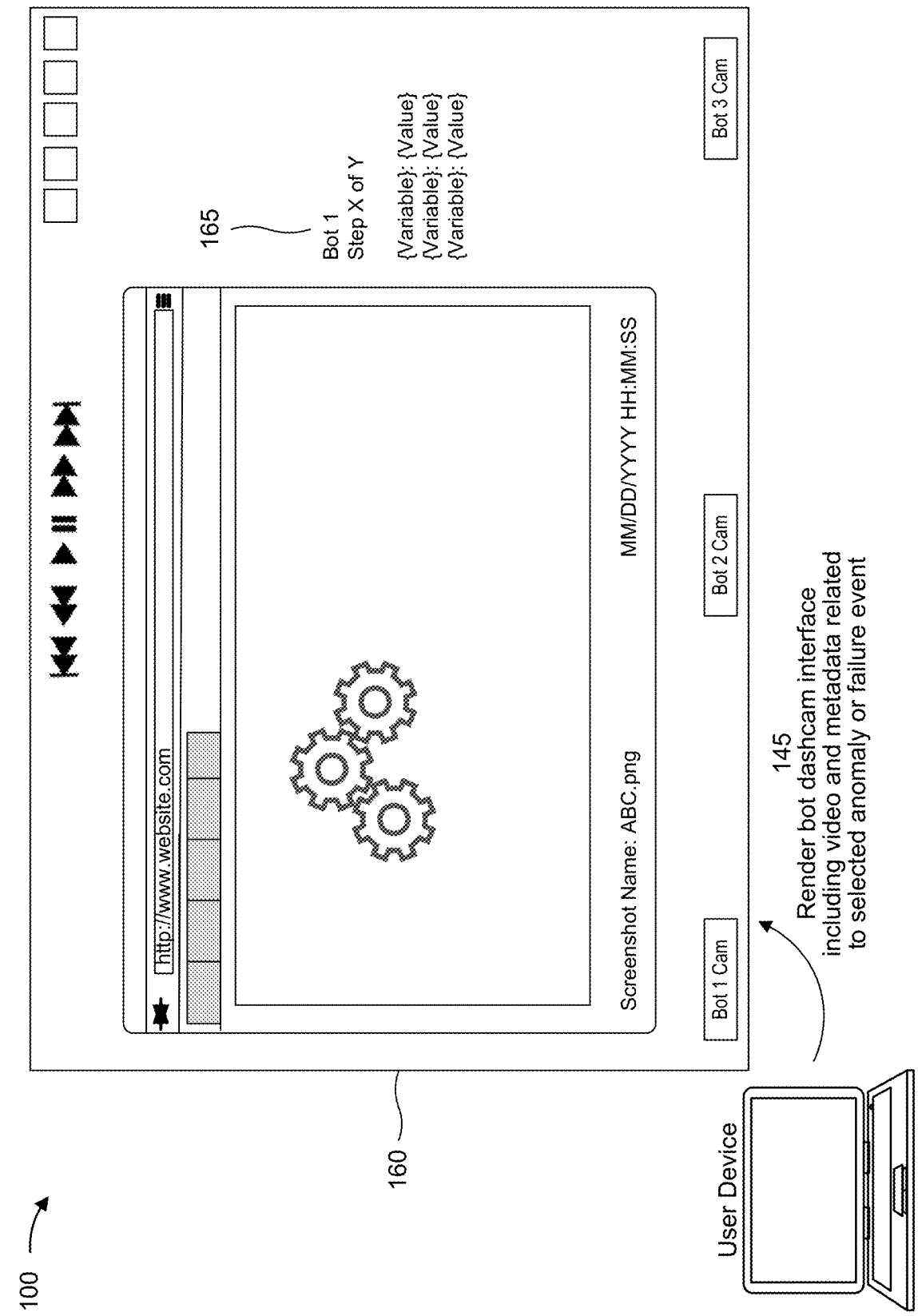

For example, FIGS. 1B-1D illustrate example user interfaces that may be rendered on the user device to display data related to the performance of one or more software bots during one or more automation runs. For example, in some implementations, the bot monitoring system may be configured to monitor various metrics associated with the software bots in order to provide a high-level overview of the performance of the monitored software bots. Accordingly, as shown by reference number 130 in FIG. 1B, the user interface data that the bot monitoring system provides to the user device may include data that can be used to populate one or more interfaces that show the overall bot performance metrics. For example, in FIG. 1B, reference number 135 depicts an example user interface used to depict the performance metrics for a set of three (3) software bots monitored by the bot monitoring system. For example, as shown, the user interface includes elements to indicate the number of software bots monitored by the bot monitoring system, a number of minutes saved by the software bots (e.g., a number of minutes that human users were able to use to perform tasks other than those automated by the monitored software bots, and/or costs that were saved by the software bots). In addition, as shown, the user interface may allow the user to view more granular data for individual software bots, which is shown in the form of line graphs depicting the number of tasks or items processed by each software bot, costs saved by each software bot, and/or minutes saved by each software bot, among other examples. Furthermore, as shown by reference number 140, the user interface data may include selectable buttons or other user interface elements to display the dashcam interface (e.g., video data) associated with an automation run performed by a particular software bot. For example, in FIG. 1B, the user interface includes three buttons that correspond to the three software bots that are the subject of the current rendering, and the user may select any of the three buttons to bring up another interface that shows the dashcam interface for the corresponding software bot.

For example, as shown in FIG. 1C, and by reference number 145, the user device may render a bot dashcam interface that includes video data and associated metadata related to a particular automation run or a selected event or time period during the automation run (e.g., a time period that includes or surrounds a failure or anomaly event). In this case, rather than having to go through a process of logging into the computing environment where the software bot is running, retrieving the automation runs that are being performed, and then recreating or reviewing the automation runs, reference number 150 depicts a front-end view of an automation product or an automation tool that the user device may be using to create and/or deploy software bots with an alerting capability to generate in-the-moment or on-demand video when an error (e.g., a failure or anomaly) occurs. In this case, rather than signing into the computing environment hosting the software bot, the user may click a button or otherwise select a user interface element to obtain the most recent and relevant video clip that the bot monitoring system generated with a machine learning model applied to annotate the frames in the video clip with contextual information contained in one or more logs. As a result, the interface shown by reference number 150 provides a view of the internal processing within the computing environment, shown as Hypertext Markup Language (HTML), Cascading Style Sheets (CSS), and JavaScript (JS) code running in a virtual machine. Furthermore, as shown by reference number 155, the interface may include media controls to play, pause, rewind, fast forward, or otherwise control playback of the video data that depicts the behavior of the software bot.

Additionally, or alternatively, referring to FIG. 1D, the interface shown by reference number 160 may include a video that is composed from a time-ordered series of screenshots, where each screenshot depicts a user interface view that was presented to a bot during an automation run. In some implementations, each screenshot that is included in the video may be accompanied by information that indicates a file name or other descriptor of the screenshot (e.g., "ABC.png" in the illustrated example) and/or a timestamp including a date and/or time when the screenshot was captured. Additionally, or alternatively, as shown by reference number 165, each screenshot may be associated with an information section that describes the current step in the bot execution during the depicted automation run and any relevant bot metadata that was captured during the corresponding time period (e.g., a time period between a previous and next screenshot). In this way, the interface shown in FIG. 1D may be used to present a video that depicts the information that is presented to the bot at different points in the automation run, what the bot is supposed to be doing at different points in the automation run, and/or which variables and/or parameters are affecting or otherwise influencing the behavior or logic of the bot. Additionally, or alternatively, in some cases, the view of the internal processing of the bot (e.g., as shown in FIG. 1C) and the video depicting the screen visible to the bot (e.g., as shown in FIG. 1D) may be combined within a single interface.

In some implementations, the user interfaces shown in FIG. 1B, FIG. 1C, and/or FIG. 1D may further provide the user with an option to select a particular time span (e.g., focusing on a certain data point or range of data points in FIG. 1B), and the bot monitoring system may dynamically generate the video data and the supporting metadata and user interface data that covers the requested time span. In other examples, the interfaces may provide sliders or other user interface elements to selectably control the time span covered by the video data, and the bot monitoring system may dynamically generate the video to cover the indicated time period (e.g., obtaining the relevant screenshots to be stitched together, applying the machine learning models to annotate the screenshots and remove irrelevant or duplicate frames, and then creating the video rendering). Additionally, or alternatively, in cases where the bot monitoring system captures text data or other suitable interaction data rather than images (e.g., to reduce storage burdens), the screenshots or video data may then be recreated as-needed based on a known formatting of the interface associated with the software bot. For example, if the software bot is designed as a chatbot with a user interface having a known format and layout, screenshots of the chatbot application may be generated on-demand (rather than captured during the automation run) based on the chat text history.

As indicated above, FIGS. 1A-1D are provided as an example. Other examples may differ from what is described with regard to FIGS. 1A-1D.

Figure 2:
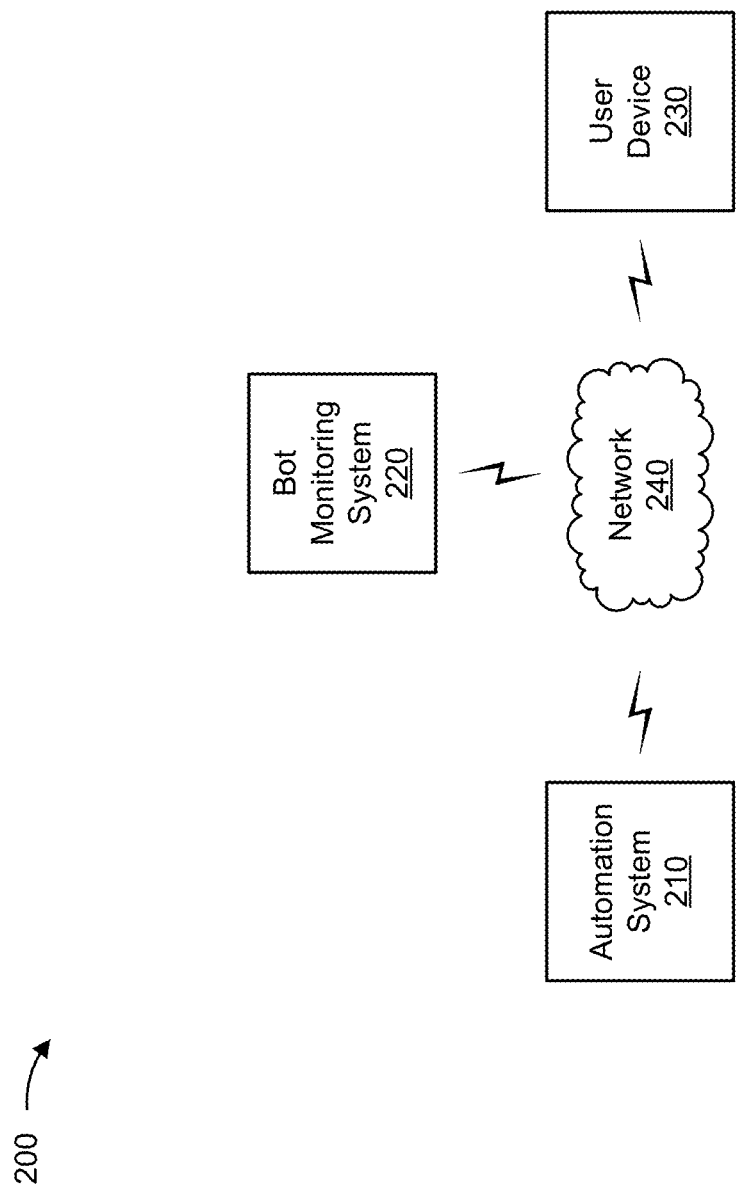
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an automation system 210, a bot monitoring system 220, a user device 230, and a network 240. Devices of environment 200 may interconnect via wired connections, wireless connections, or a combination of wired and wireless connections.

The automation system 210 includes one or more devices capable of receiving, generating, storing, processing, providing, and/or routing information associated with generating video streams to depict bot performance during an automation run, as described elsewhere herein. The automation system 210 may include a communication device and/or a computing device. For example, the automation system 210 may include a server, such as an application server, a client server, a web server, a database server, a host server, a proxy server, a virtual server (e.g., executing on computing hardware), or a server in a cloud computing system. In some implementations, the automation system 210 includes computing hardware used in a cloud computing environment.

The bot monitoring system 220 includes one or more devices capable of receiving, generating, storing, processing, providing, and/or routing information associated with generating video streams to depict bot performance during an automation run, as described elsewhere herein. The bot monitoring system 220 may include a communication device and/or a computing device. For example, the bot monitoring system 220 may include a server, such as an application server, a client server, a web server, a database server, a host server, a proxy server, a virtual server (e.g., executing on computing hardware), or a server in a cloud computing system. In some implementations, the bot monitoring system 220 includes computing hardware used in a cloud computing environment.

The user device 230 may include one or more devices capable of receiving, generating, storing, processing, and/or providing information associated with generating video streams to depict bot performance during an automation run, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
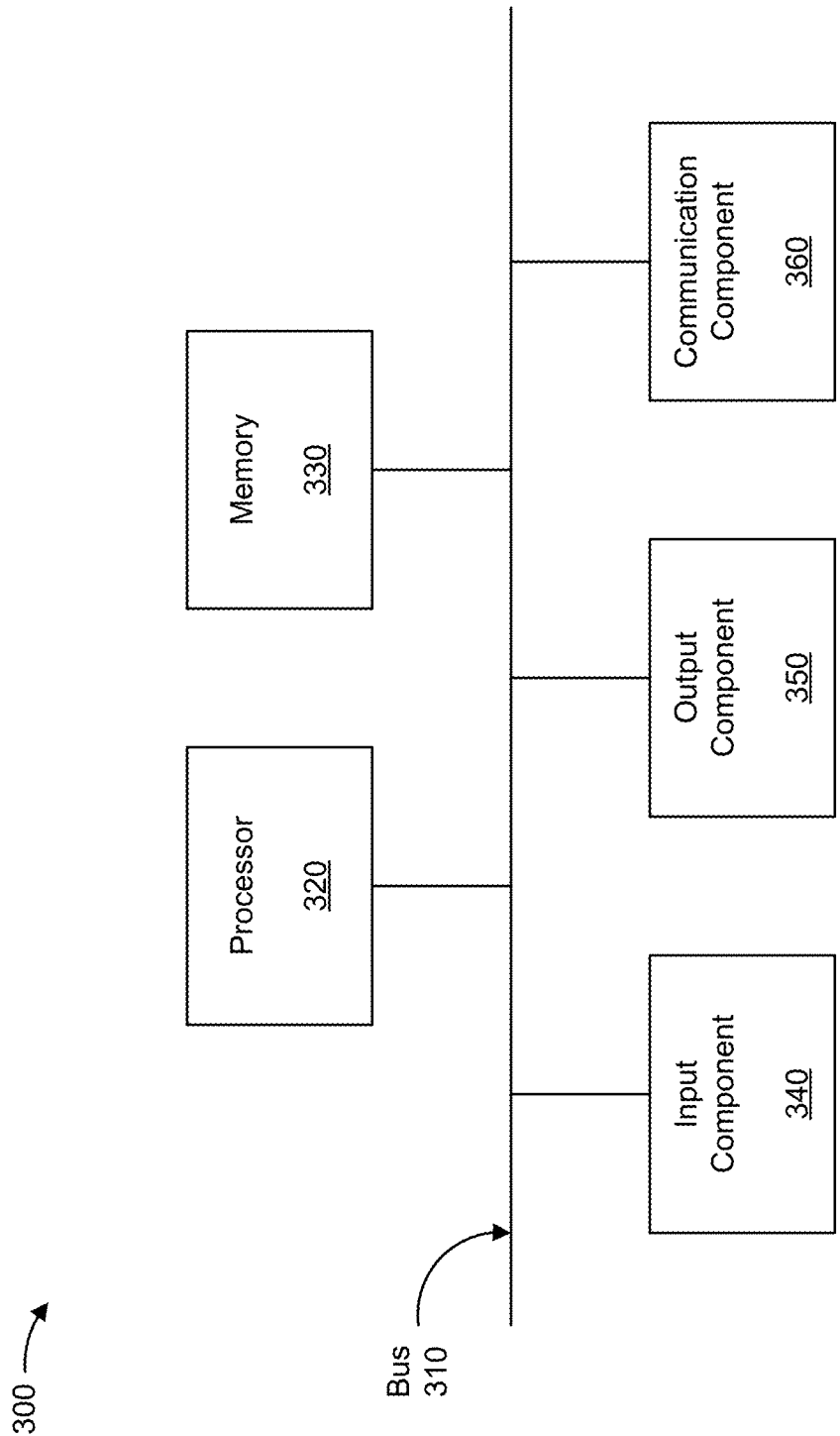
FIG. 3 is a diagram of example components of one or more devices of FIG. 2, in accordance with some embodiments of the present disclosure.

FIG. 3 is a diagram of example components of a device 300 associated with generating video streams to depict bot performance during an automation run. Device 300 may correspond to the automation system 210, the bot monitoring system 220, and/or the user device 230. In some implementations, the automation system 210, the bot monitoring system 220, and/or the user device 230 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
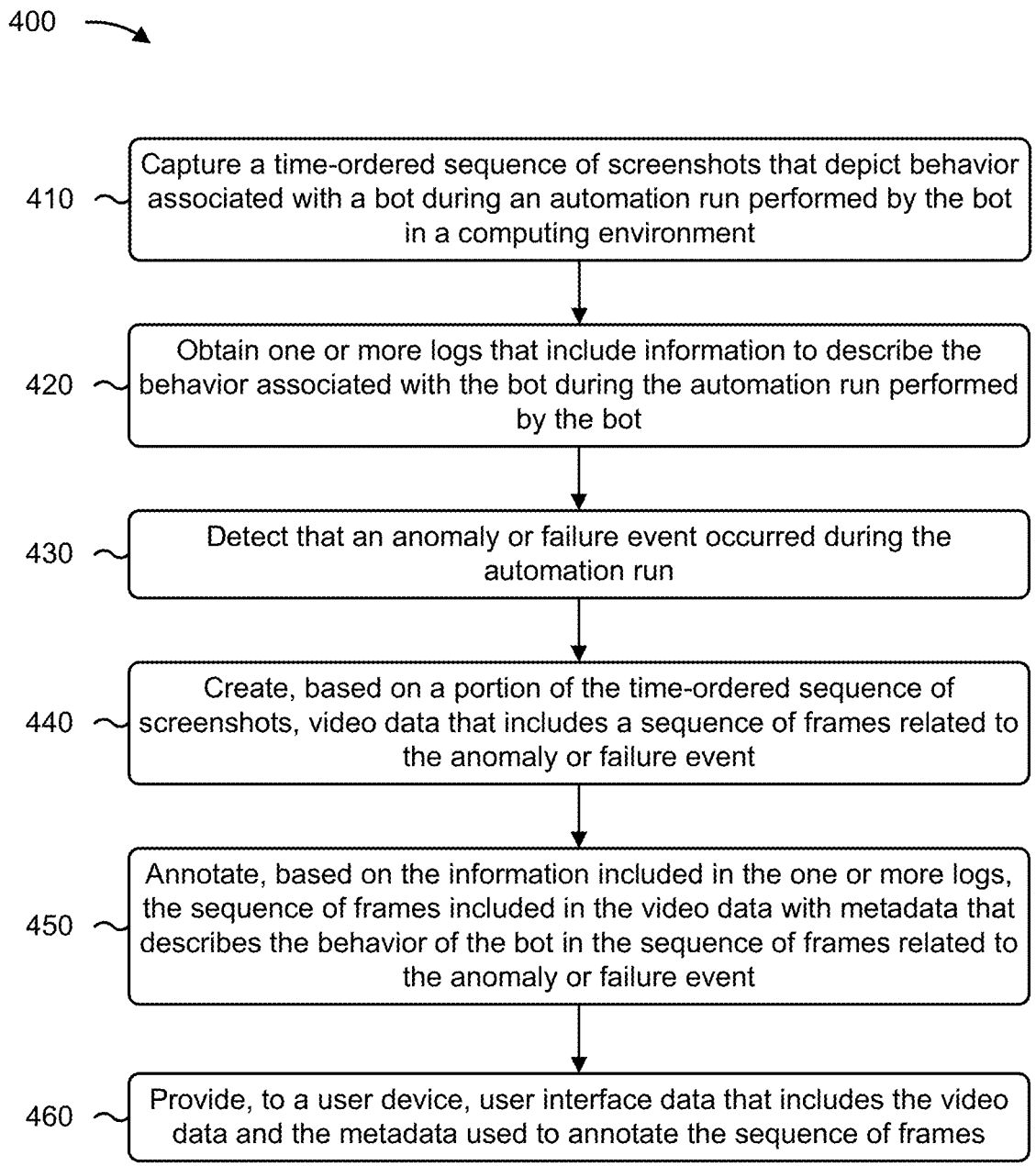

FIG. 4 is a flowchart of an example process 400 associated with generating video streams to depict bot performance during an automation run. In some implementations, one or more process blocks of FIG. 4 may be performed by the bot monitoring system 220. In some implementations, one or more process blocks of FIG. 4 may be performed by another device or a group of devices separate from or including the bot monitoring system 220, such as the automation system 210 and/or the user device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include capturing a time-ordered sequence of screenshots that depict behavior associated with a bot during an automation run performed by the bot in a computing environment (block 410). For example, the bot monitoring system 220 (e.g., using processor 320 and/or memory 330) may capture a time-ordered sequence of screenshots that depict behavior associated with a bot during an automation run performed by the bot in a computing environment, as described above in connection with reference numbers 105 and 110 of FIG. 1A. As an example, the bot may be deployed in a computing environment such as a virtual machine to perform an automation run that simulates one or more activities that would normally be performed by a user, and the bot monitoring system may periodically capture screenshots that are associated with respective time stamps to depict the visual or graphical state of the computing environment at different points in time during the automation run.

As further shown in FIG. 4, process 400 may include obtaining one or more logs that include information to describe the behavior associated with the bot during the automation run performed by the bot (block 420). For example, the bot monitoring system 220 (e.g., using processor 320 and/or memory 330) may obtain one or more logs that include information to describe the behavior associated with the bot during the automation run performed by the bot, as described above in connection with reference numbers 105 and 110 of FIG. 1A. As an example, the bot may perform one or more activities or tasks during the automation run, and the one or more logs may include timestamped records of the activities or tasks performed during the automation run and/or events that occur as an effect of the activities or tasks performed during the automation run.

As further shown in FIG. 4, process 400 may include detecting that an anomaly or failure event occurred during the automation run (block 430). For example, the bot monitoring system 220 (e.g., using processor 320 and/or memory 330) may detect that an anomaly or failure event occurred during the automation run, as described above in connection with reference numbers 110 and 115 of FIG. 1A. As an example, the automation run may initiate a task that is expected to take a certain amount of time to complete, and the bot detection system may detect the anomaly based on a lengthy idle period that significantly exceeds the amount of time that the task was expected to take to complete. As another example, the automation run may include launching a series of applications, and a failure event may be detected based on one or more of the applications crashing during the automation run before the corresponding task completed.

As further shown in FIG. 4, process 400 may include creating, based on a portion of the time-ordered sequence of screenshots, video data that includes a sequence of frames related to the anomaly or failure event (block 440). For example, the bot monitoring system 220 (e.g., using processor 320 and/or memory 330) may create, based on a portion of the time-ordered sequence of screenshots, video data that includes a sequence of frames related to the anomaly or failure event, as described above in connection with reference number 115 of FIG. 1A. As an example, a user device may request video data for a particular time period around an anomaly or failure event or the bot monitoring system may determine a time period during the automation run that provides meaningful context for the anomaly or failure event, and the bot monitoring system may generate video data by stitching together a portion of the time-ordered screenshots that cover the time period of interest.

As further shown in FIG. 4, process 400 may include annotating, based on the information included in the one or more logs, the sequence of frames included in the video data with metadata that describes the behavior of the bot in the sequence of frames related to the anomaly or failure event (block 450). For example, the bot monitoring system 220 (e.g., using processor 320 and/or memory 330) may annotate, based on the information included in the one or more logs, the sequence of frames included in the video data with metadata that describes the behavior of the bot in the sequence of frames related to the anomaly or failure event, as described above in connection with reference number 115 of FIG. 1A. As an example, the data contained in the one or more logs may be timestamped, which may allow a record in the one or more logs to be correlated with one or more screenshots that have the same timestamp or timestamps within a threshold time of the record. Accordingly, in this example, the records in the logs that are associated with the same or similar timestamps as one or more frames in the video data may be used as metadata to annotate the corresponding frames and provide insight into the behavior of the software bot that is being depicted in the corresponding frames.

As further shown in FIG. 4, process 400 may include providing, to a user device, user interface data that includes the video data and the metadata used to annotate the sequence of frames (block 460). For example, the bot monitoring system 220 (e.g., using processor 320 and/or memory 330) may provide, to a user device, user interface data that includes the video data and the metadata used to annotate the sequence of frames, as described above in connection with reference number 120 of FIG. 1A. As an example, the user interface data may depict performance metrics for one or more bots, which may be provided to a user device such that the video data can be displayed on the user device to recreate and investigate the behavior of the software bot during a particular period of interest without the user device having to log into the computing environment where the software bot is hosted and/or executed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

FIG. 5 is a flowchart of an example process 500 associated with generating video streams to depict bot performance during an automation run. In some implementations, one or more process blocks of FIG. 5 may be performed by the user device 230. In some implementations, one or more process blocks of FIG. 5 may be performed by another device or a group of devices separate from or including the user device 230, such as the automation system 210 and/or the bot monitoring system 220. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include providing a request to generate a video stream related to behavior associated with a bot during an automation run performed by the bot in a computing environment that hosts the bot, wherein the request includes one or more parameters related to the behavior associated with the bot to be depicted in the video stream (block 510). For example, the user device 230 (e.g., using processor 320 and/or memory 330) may provide a request to generate a video stream related to behavior associated with a bot during an automation run performed by the bot in a computing environment that hosts the bot, wherein the request includes one or more parameters related to the behavior associated with the bot to be depicted in the video stream, as described above in connection with reference number 120 of FIG. 1A. As an example, the user device may identify a software bot whose behavior is to be recreated in a video rendered on the user device, and may identify any other suitable parameters such as a time period of interest and/or a frequency at which screenshots depicting the behavior of the software bot are to be captured.

As further shown in FIG. 5, process 500 may include receiving the video stream related to the behavior associated with the bot during the automation run, wherein the video stream includes: a sequence of screenshots that is stitched into video frames based on the one or more parameters included in the request, and metadata that describes the behavior of the bot in the sequence of screenshots based on the one or more parameters included in the request (block 520). For example, the user device 230 (e.g., using processor 320, memory 330, input component 340, and/or communication component 360) may receive the video stream related to the behavior associated with the bot during the automation run, wherein the video stream includes: a sequence of screenshots that is stitched into video frames based on the one or more parameters included in the request, and metadata that describes the behavior of the bot in the sequence of screenshots based on the one or more parameters included in the request, as described above in connection with reference number 120 of FIG. 1A. As an example, the bot monitoring system may obtain a time-ordered sequence of screenshots or other suitable data that can be used to generate screenshots or user interface states related to interactions performed by the software bot during a period of interest, and the bot monitoring system may further obtain one or more logs that include records related to activities or tasks performed by the software bot and/or effects of the activities or tasks performed by the software bot. Accordingly, the bot monitoring system may generate user interface data that includes a rendering of the interactions performed by the software bot during the period of interest based on the captured screenshots or the screenshots or user interface states that are derived from other data (e.g., text interactions) captured from the computing environment where the software bot is hosted and/or executed.

As further shown in FIG. 5, process 500 may include rendering the video stream on a display (block 530). For example, the user device 230 (e.g., using processor 320 and/or memory 330) may render the video stream on a display, as described above in connection with reference number 125 of FIG. 1A. As an example, the user device may provide media playback controls to allow a user to play, pause, rewind, fast forward, or otherwise control playback of the video stream on a display of the user device, whereby the automation run performed by the software bot may be recreated on the user device as though the software bot were running on the user device. In this way, the user of the user device can review or investigate the behavior of the software bot during the automation run based on the video stream and the supporting metadata without having to access the computing environment where the software bot is hosted and/or executed and/or establish a new computing environment and allocate resources to a testing or debugging automation run in an attempt to reproduce a failure or anomaly event.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating video streams to depict software bot performance, comprising:
    one or more memories; and
    one or more processors, communicatively coupled to the one or more memories, configured to:
       capture a time-ordered sequence of screenshots that depict behavior associated with a software bot during an automation run performed by the software bot in a computing environment;
       obtain one or more logs that include information to describe the behavior associated with the software bot during the automation run performed by the software bot;
       detect that an anomaly or a failure event occurred during the automation run;
       create, based on a portion of the time-ordered sequence of screenshots and a request from a user device that indicates a time period associated with the anomaly or the failure event, video data that includes a sequence of frames related to the anomaly or the failure event, wherein the time-ordered sequence of screenshots is captured at a first frequency if the anomaly is detected and a second frequency that is lesser than the first frequency if the software bot is idle;
       annotate, based on the information included in the one or more logs and the request from the user device, the sequence of frames with metadata that describes behavior of the software bot in the sequence of frames; and
       provide, to the user device, user interface data that includes the video data and the metadata.

2. The system of claim 1,
    wherein the one or more processors, to detect that the anomaly or the failure event occurred during the automation run, are configured to:
       compare the behavior associated with the software bot during the automation run to historical software bot behavior associated with successful automation runs, wherein the anomaly or the failure event is detected based on the behavior associated with the software bot during the automation run deviating from the historical software bot behavior associated with the successful automation runs.

3. The system of claim 1,
    wherein the one or more processors, to create the video data, are configured to:
       identify, among the portion of the time-ordered sequence of screenshots, one or more irrelevant screenshots that are unrelated to the anomaly or the failure event,
          wherein the one or more irrelevant screenshots are excluded from the sequence of frames.

4. The system of claim 1,
    wherein the one or more processors, to create the video data, are configured to:
       identify, among the portion of the time-ordered sequence of screenshots, one or more duplicate screenshots that are identical to other screenshots related to the anomaly or the failure event,
          wherein the one or more duplicate screenshots are excluded from the sequence of frames.

5. The system of claim 1, wherein the time-ordered sequence of screenshots is captured at the second frequency that is lesser than the first frequency if the software bot is idle while performing a task that has a processing delay.

6. The system of claim 1, wherein
the time period includes, leads up to, or follows the anomaly or the failure event.

7. The system of claim 1,
wherein the user interface data includes an alert identifying a task that caused the anomaly or the failure event and a recommendation to debug automation programming associated with the task.

8. The system of claim 1,
wherein the one or more processors are further configured to:
provide, to the user device, a notification related to the anomaly or the failure event.

9. A method for rendering video streams related to software bot performance, comprising:
providing, by a user device and to a monitoring system, a request to generate a video stream related to behavior associated with a software bot during an automation run performed by the software bot in a computing environment that hosts the software bot,
wherein the request includes one or more parameters related to the behavior, the behavior to be depicted in the video stream;
receiving, by the user device and from the monitoring system, the video stream related to the behavior,
wherein the video stream includes:
a sequence of screenshots that is stitched into video frames based on the one or more parameters included in the request, and
metadata that describes the behavior based on the one or more parameters included in the request,
wherein the metadata is derived, based on one or more relevance scores, from information included in one or more logs, the information describing the behavior, and
wherein the sequence of screenshots is captured at a frequency that is adjustable based on whether an anomaly or a failure event is detected; and
rendering, by the user device, the video stream on a display.

10. The method of claim 9,
wherein the video stream is rendered by the user device in a computing environment that is separate from the computing environment that hosts the software bot.

11. The method of claim 9,
wherein the one or more parameters included in the request include the frequency.

12. The method of claim 9,
wherein the video stream includes one or more recommendations to modify the behavior.

13. The method of claim 9, further comprising:
receiving, from the monitoring system, a notification indicating that the monitoring system detected the anomaly or the failure event during the automation run,
wherein the request to generate the video stream related to the behavior is provided based on the notification indicating that the monitoring system detected the anomaly or the failure event during the automation run.

14. The method of claim 9,
wherein the request indicates a time period to be covered by the video stream.

15. A non-transitory computer-readable medium storing a set of instructions, the set of instructions comprising:
one or more instructions that, when executed by one or more processors of a monitoring system, cause the monitoring system to:
capture time-ordered data that represents behavior associated with a software bot during an automation run performed by the software bot in a computing environment;
obtain one or more logs that include information to describe the behavior associated with the software bot during the automation run performed by the software bot;
create, based on a portion of the time-ordered data and a request from a user device that indicates a time period associated with an anomaly or a failure event, video data that includes a sequence of frames related to the anomaly or the failure event;
annotate, based on the information included in the one or more logs and the request from the user device, the time-ordered data with metadata that describes the behavior associated with the software bot,
wherein the time-ordered data is captured at a first frequency if the anomaly is detected and a second frequency that is lesser than the first frequency if the software bot is idle; and
provide, to the user device, user interface data that includes the video data and the metadata.

16. The non-transitory computer-readable medium of claim 15,
wherein the one or more instructions further cause the monitoring system to:
identify, in the time-ordered data that represents the behavior associated with the software bot during the automation run, one or more irrelevant or duplicate data items,
wherein the one or more irrelevant or duplicate data items are excluded from the video data.

17. The non-transitory computer-readable medium of claim 15,
wherein the is first frequency and the second frequency are configured by the user device.

18. The non-transitory computer-readable medium of claim 15,
wherein the video data is created and annotated with the metadata based on the request from the user device.

19. The non-transitory computer-readable medium of claim 15,
wherein the user interface data includes one or more recommendations to modify the behavior associated with the software bot.

20. The non-transitory computer-readable medium of claim 15,
wherein the one or more instructions further cause the monitoring system to:
provide, to the user device, a notification related to the behavior associated with the software bot.

* * * * *